United States Patent Office 3,532,690
Patented Oct. 6, 1970

3,532,690
TRIAZINYL- AND PYRIMIDINYL ANTHRAQUINONE DYESTUFFS
Dennis Eckersley and Robert Norman Heslop, Manchester, England, assignors to Imperial Chemical Industries Limited, London, England, a corporation of Great Britain
No Drawing. Filed May 12, 1967, Ser. No. 637,912
Claims priority, application Great Britain, May 27, 1966, 23,792/66
Int. Cl. C09b *1/46;* C07d *51/44*
U.S. Cl. 260—239.75   3 Claims

ABSTRACT OF THE DISCLOSURE

The invention provides new reactive water-soluble anthraquinone dyestuffs of the formula:

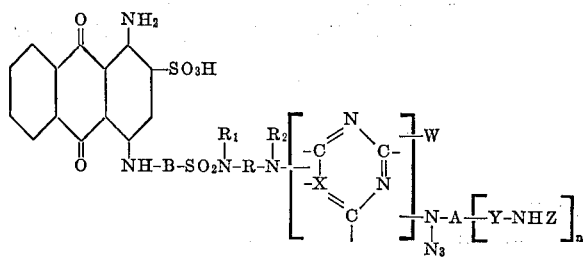

wherein B represents a phenylene nucleus which may be substituted, $R_1$, $R_2$ and $R_3$ each independently represents H or an alkyl group having 1 to 4 carbon atoms; R represents a divalent aliphatic or carbocyclic radical; X represents N, C—Cl or C—CN; W represents Cl or Br; A represents a benzene or naphthalene radical, which may be substituted; Y represents CO or $SO_2$; Z represents an alkyl radical having 2 or more carbon atoms and substituted in $\beta$-position to the NH group by Cl or $O \cdot SO_3H$; and $n$ represents 1 or 2.

This invention relates to new water-soluble reactive anthraquinone dyestuffs, to the methods of preparation thereof and to the use of such dyestuffs for colouring textile materials.

It is known to use dyestuffs containing s-triazine and pyrimidine groups containing reactive halogen atoms for the purpose of colouring fibres containing hydroxyl groups, especially cellulose materials such as cotton and viscose rayon.

These dyestuffs readily fix on such materials with good fastness to wet processing, since the halogen atom is able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the halogen atom reacts with water instead of the cellulose molecule, a considerable portion of the dyestuff does not fix on the fibre.

Consequently an excess of dyestuff must be used and the dyeings or prints must be thoroughly washed with boiling soap solutions to remove the unfixed dyestuff. The wastage of dyestuff and extra processing make the dyeing or printing process more expensive especially when deep shades are required.

The present invention is concerned with the production of water-soluble halogeno-s-triazine and pyrimidine reactive dyestuffs of particular value in textile printing which have a remarkably high fixation on the fibre and for which washing-off treatments can be reduced considerably.

According to the invention there are provided reactive water-soluble anthraquinone dyestuffs of the formula:

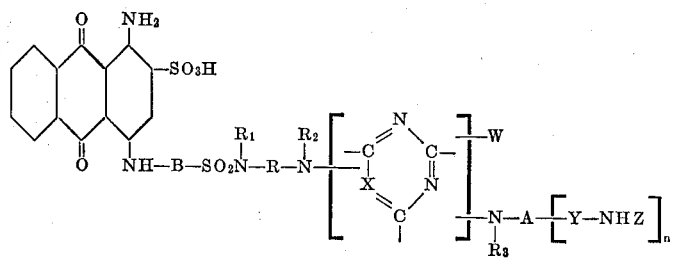

wherein

B represents a phenylene nucleus which may be substituted, $R_1$, $R_2$ and $R_3$ each independently represents H or an alkyl group having 1 to 4 carbon atoms, R represents a divalent aliphatic or carbocyclic radical, X represents N, C—Cl or C—CN, W represents Cl or Br, A represents a benzene or naphthalene radical, which may be substituted, Y represents CO or $SO_2$, Z represents an alkyl radical having 2 or more carbon atoms and substituted in β-position to the NH group by Cl or $O \cdot SO_3H$, and $n$ represents 1 or 2.

As examples of substituents which may be present in the phenylene nucleus represented by B, there may be mentioned methyl, chlorine and sulphonic acid. The sulphonyl group is preferably attached in para or, more especially, in meta position to the NH group.

As examples of divalent aliphatic radicals represented by R, there may be mentioned alkylene radicals having 2 to 6 carbon atoms, for example, ethylene, propylene, hexamethylene, and alkylene ether radicals, for example the —$C_2H_4$O—$C_2H_4$— radical.

As examples of carboxylic radicals represented by R, there may be mentioned cycloaliphatic radicals, for example, cyclohexylene, but more especially aromatic carbocyclic radicals, for example benzene, naphthalene, diphenyl, diphenylmethane and diphenyloxide radicals, which may be substituted for example, by methyl, chlorine or sulphonic acid.

As examples of substituents which may be present in the benzene or naphthalene radical represented by A, there may be mentioned methyl, chlorine and methoxy.

A preferred class of the new anthraquinone dyestuffs are those represented by the formula:

$$\text{[anthraquinone structure]} - NH.C_6H_4.SO_2NH.R_4NH-C \underset{N}{\overset{N}{\diagup}} \diagdown C - NH.C_6H_3(SO_2NHCH_2\overset{OSO_3H}{\underset{|}{C}}H.(CH_2)_mH)_2 \quad (2)$$

where $R_4$ represents phenylene, sulphophenylene, ethylene or propylene, and $m$ is 0 or 1.

According to a further feature of the invention there is provided a process for manufacture of the new anthraquinone dyestuffs which comprises reacting a heterocyclic compound of the formula:

$$W-C\underset{X}{\overset{N}{\diagup}}\underset{\diagdown C \diagup}{\overset{\diagdown N}{}}C-W \quad (3)$$

wherein X and W have the meanings stated above, in either order, with one mole of an anthraquinone compound of the formula:

$$\text{[anthraquinone]} \quad NH-B-SO_2\underset{R_1}{\overset{}{N}}-R-\underset{R_2}{\overset{}{N}}H \quad (4)$$

wherein B, R, $R_1$ and $R_2$ have the meanings stated above, and with one mole of an amine of the formula:

$$NH-A\underset{R_3}{\overset{}{\Big[}}Y-NHZ\Big]_n \quad (5)$$

wherein A, $R_3$, Y, Z and $n$ have the meanings stated above.

The compounds of Formula 3 which may be used are cyanuric chloride, cyanuric bromide, 2:4:5:6-tetrachloro- or tetrabromo-pyrimidine and 2:4:6-trichloro- or tribromo-5-cyanopyrimidine.

As examples of amines of Formula 5, there may be mentioned 3,5-bis-(β-sulphatoethylsulphamyl)aniline, 3,5-bis-(β-sulphatopropylsulphamyl)aniline, 3,5-bis-(β-chloroethylsulphamyl)aniline, 3,5 - bis - (β-chloropropylsulphamyl)aniline, 3,5 - bis - (β-sulphatopropylsulphamyl)-4-methyl aniline and 3-(β-sulphatopropylcarbamyl) - 5-(β-sulphatopropylsulphamyl)aniline.

The anthraquinone compounds of Formula 4 can conveniently be obtained by the process described and claimed in United Kingdom Pat. No. 1,027,261, that is to say, by contacting together in an aqueous medium, an anthraquinone compound of the formula:

$$\text{[anthraquinone with } NH_2, SO_3H, NH-B-S_2Cl\text{]} \quad (6)$$

where B has the meaning stated above, and a diamine of the formula:

$$\underset{R_1}{\overset{NH}{|}}-R-\underset{R_2}{\overset{NH}{|}} \quad (7)$$

wherein R, $R_1$ and $R_2$ have the meanings stated above. As examples of such anthraquinone compounds, there may be mentioned the products obtained by the method described and claimed in United Kingdom Pat. No. 952,497, that is to say, by heating anthraquinone compounds of the formula:

$$\text{[anthraquinone with } NH_2, SO_3H, NH-B-SO_3H\text{]} \quad (8)$$

in which the ring B can be further substituted, with chlorosulphonic acid either alone or preferably in the presence of an inorganic halide such as thionyl chloride, phosphorous trichloride or phosphorous oxychloride.

As examples of amines of Formula 7 there may be mentioned ethylene and proylene diamines and the N-methyl or N,N'-dimethyl derivatives of these, o-, m- or p-phenylene diamines and their nuclearly-substituted derivatives, e.g. halogeno- methyl-, acetylamino-, carboxy- or sulphophenylene diamines, their N-methyl or N,N'-dimethyl derivatives; also naphthylene diamines and sulphonaphthylene diamines, benzidine, mono or disulpho-benzidines and other nuclearly-substituted benzidines such as 3,3'-dimethoxy benzidine and o-tolidine; diaminodiphenylmethane, diaminodiphenyloxide and their sulphonic acids.

The above process can conveniently be carried out by suspending or dissolving the heterocyclic compound in water or in a mixture of water with a water-miscible organic solvent, adding one of the other two reagents, or a solution thereof in water or in a water-miscible organic solvent, stirring the mixture at a suitable temperature until one chlorine or bromine atom on the heterocyclic compound has been reacted, or substantially so, then adding the third reactant and stirring at a suitable temperature to effect reaction of the second chlorine or bromine atom. In general, a temperature of 0 to 5° C. is suitable for the first step and a temperature of 30 to 50° C. is suitable for the second step. The reaction is preferably carried out in the presence of an acid-binding agent, added at such a rate as to maintain the pH of the reaction mixture between the limits of 4 and 9.

The new dyestuffs can be isolated by any of the usual means used in connection with water-soluble reactive dyestuffs, preferably by the addition of sodium chloride, and filtering off the precipitated dyestuff and drying.

The new dyestuffs can be used for dyeing or printing a wide variety of textile materials. They are particularly valuable for use as reactive dyes for the textile printing of cellulose with which they are capable, in the presence of acid-binding agents, of reacting with a high degree of efficiency and because of the bright reddish-blue shades provided.

The invention is illustrated but not limited by the following examples in which parts are by weight.

EXAMPLE 1

A solution of 6.88 parts of disodium salt of 1-amino-4-[3'-N-(4" - aminophenyl)sulphamylanilino]anthraquinone-2:3"-disulphonic acid in 120 parts of water is added during 20 minutes to a stirred suspension of 2.1 parts of cyanuric chloride in 12 parts of acetone and 80 parts of water at 0°–5° C. The pH of the mixture is maintained by means of 2 N sodium carbonate at 5–5.5 and stirring under these conditions is continued for a further 1 hour. The reaction mixture is filtered, the filtrates are adjusted to pH 6.8 and a neutral solution of 5.6 parts of 3:5-bis-($\beta$-sulphatopropylsulphamyl)aniline in 120 parts of water is added. The mixture is stirred at 35°–40° C. and at pH 6.7 for 4 hours, then a further 2.25 parts of 3:5-bis-($\beta$-sulphatopropylsulphamyl)aniline dissolved in 50 parts of water is added and stirring is continued at 43–45° C. and at pH 6.7 for 7 hours. The solution is filtered, sodium chloride (20% w./v.) added and the precipitated dyestuff filtered. The product is purified by redissolving in water and reprecipitating by addition of sodium chloride (25% w./v.) and is finally isolated by filtering, washing with 25% (w./v.) sodium chloride solution and drying in vacuo at room temperature. The product contains one hydrolysable chlorine atom per molecule and when applied to cellulosic fibres in conjunction with an acid-binding agent yields bright reddish-blue shades of excellent fastness to wet treatments and to light.

EXAMPLE 2

If the 3:5-bis-($\beta$-sulphatopropylsulphamyl)aniline used in Example 1 is replaced by the equivalent amount of 3:5-bis-($\beta$-sulphatoethylsulphamyl)aniline, a dyestuff possessing very similar properties is obtained.

EXAMPLE 3

A printing paste is made by mixing together 6.7 grams of the product of Example 1 (containing 5 grams of the pure dyestuff), 20 grams of urea, 35 parts of 4% aqueous sodium alginate, 1 gram of sodium m-nitrobenzene sulphonate and 1.5 grams of sodium carbonate and sufficient water to give 100 grams total weight. This paste is applied to cotton fabric by a roller and the fabric is then baked at 150° C. and 5 minutes, washed in boiling 0.3% detergent for 5 minutes to remove unfixed dyestuff, rinsed in water and dried.

Examination of the washing liquor shows that 9% of the dyestuff had not fixed. By printing on viscose rayon fabric and steaming for 10 minutes at 100° C., a fixation of 88% of dyestuff is achieved.

EXAMPLE 4

8.6 parts of the disodium salt of 1-amino-4-[3'-N-(4"-aminophenyl)sulphamylanilino]anthraquinone - 2:3"-disulphonic acid are condensed with 2.6 parts of cyanuric chloride following the procedure described in Example 1, the reaction mixture is filtered and adjusted to pH 7.0 and a neutral solution of 4.6 parts of 3-amino-5-($\beta$-chloroethylsulphamyl) benzoic acid in 35 parts of water is added. The mixture is stirred at 35° C. and pH 6.8 to 7.0 for 2 hours, and then at 40° C. and pH 6.8 to 7.0 for 8 hours. The solution is then filtered and adjusted to pH 7.5, sodium chloride (13% w./v.) added with stirring and the dyestuff thus precipitated in filtered off, washed with 14% (w./v.) sodium chloride solution and finally dried in vacuo at room temperature. The product contains 1.93 hydrolysable chlorine atoms per molecule and molecule and yields bright reddish-blue shades of excellent fastness to wet treatments and to light when applied to cellulosic fibres as described in Example 3.

EXAMPLE 5

If the 3:5 - bis - ($\beta$ - sulphatopropylsulphamyl)aniline used in Example 1 is replaced by the equivalent amount of 4-($\beta$ - sulphatopropylsulphamyl)aniline, a dyestuff possessing similar properties is obtained.

EXAMPLE 6

A solution of 5.16 parts of 1-amino-4-[3'-N-($\beta$-aminoethyl)sulphamylanilino]anthraquinone - 2 - sulphonic acid and 0.6 part of sodium hydroxide in 145 parts of water and 20 parts of acetone is added during 15 minutes, to a stirred suspension of 3.7 parts of cyanuric chloride in 25 parts of acetone and 75 parts of ice-water, the pH of the mixture being maintained at 8.5–9.0 by the addition, when necessary, of 2 N sodium hydroxide solution and the temperature being maintained at 0–3° C. The reaction mixture is stirred at pH 8.5–9.0 and at 0°–3° C. for a further one hour after the addition, then filtered, the filtrates adjusted to pH 6.5 and a neutral solution of 8.5 parts of 3:5-bis-($\beta$ - sulphatopropylsulphamyl) aniline in 200 parts of water added. The mixture is stirred at 50°–55° C. and the pH maintained at 6.7±0.1 using 2 N sodium carbonate solution for 24 hours, then cooled and filtered and the filtrates are treated with 24% (w./v.) sodium chloride. The dyestuff so precipitated, is filtered, washed with 24% (w./v.) sodium chloride solution and dried. The product contains approximately one hydrolysable chlorine atom per molecule and yields bright reddish-blue shades of excellent fastness when applied to cellulosic fibres in the presence of an acid binding agent.

A similar but slightly greener shade dyestuff is obtained when the above 1-amino - 4-[ 3' - N - ($\beta$-aminoethyl)sulphamylanilino]anthraquinone - 2 - sulphonic acid is replaced by an equivalent amount of 1-amino-4-[4'-N-($\gamma$-aminopropyl)sulphamylanilino]anthraquinone - 2 - sulphonic acid.

EXAMPLE 7

A solution of 13.76 parts of the disodium salt of 1-amino - 4 - [3' - N - (4"-aminophenyl)sulphamylanilino] anthraquinone - 2:3"-disulphonic acid in 240 parts of water is added during 20 minutes to a stirred suspension of 7.0 parts of cyanuric bromide in 25 parts of acetone and 150 parts of water at 0–5° C. The pH of the mixture is maintained by means of 2 N sodium carbonate at 5–5.5 and stirring under these conditions is continued for a further 45 minutes. The reaction mixture is filtered, the filtrates are adjusted to pH 6.8 and a neutral solution of 6.1 parts of 4-($\beta$ - sulphatopropylcarbamyl) - N - methylaniline in 150 parts of water is added. The mixture is stirred at 35°–40° C. and at pH 6.7 for 3 hours and then at 50–55° C. and at pH 6.7 for 2 hours. The solution is treated with 20% (w./v.) sodium chloride, and stirred for 1 hour. The precipitated dyestuff is filtered, washed with 22% (w./v.) sodium chloride solution and finally dried in vacuo at room temperature. The product contains one hydrolysable bromine atom per molecule and when applied to cellulosic fibres in conjunction with an acid-binding agent yields bright reddish-blue shades of excellent fastness to wet treatments and to light.

EXAMPLE 8

A solution of 13.76 parts of the disodium salt of 1-amino - 4 - [3' - N - (4''-aminophenyl)sulphamylanilino] anthraquinone - 2:3'' - disulphonic acid in 240 parts of water is added during 20 minutes to a stirred solution of 4.27 parts of 5-cyano-2:4:6-trichloropyrimidine in 90 parts of dioxan and 50 parts of water at 15° C. The pH of the mixture is maintained by means of 2 N sodium carbonate solution at 5.5–6.5 and stirring under these conditions is continued for a further hour. The reaction mixture is filtered, the filtrates are stirred at pH 6.5 and a neutral solution of 6.2 parts of 4-($\beta$-sulphatoethylcarbamyl)-aniline in 150 of water is added. The mixture is stirred at 55–60° C. and at pH 6.5 for 6 hours. The solution is treated with 15% (w./v.) sodium chloride and stirred for 1 hour. The precipitated dyestuff is filtered, washed with 18% (w./v.) sodium chloride solution and finally dried in vacuo at room temperature. The product contains one hydrolysable chlorine atom per molecule and when applied to cellulosic fibres in conjunction with an acid binding agent yields bright reddish blue shades of excellent fastness to wet treatments and to light.

EXAMPLE 9

By substituting a neutral solution of 13.7 parts of 4,8-bis-($\beta$-sulphatopropylsulphamyl) - 2 - naphthylamine in 200 parts of water, for the 6.1 parts of 4-($\beta$-sulphatopropylcarbamyl)-N-methylaniline in 150 parts of water used in Example 7, a dyestuff of similar shade and wet fastness properties is obtained.

We claim:
1. A reactive water-soluble anthraquinone dyestuff of the formula:

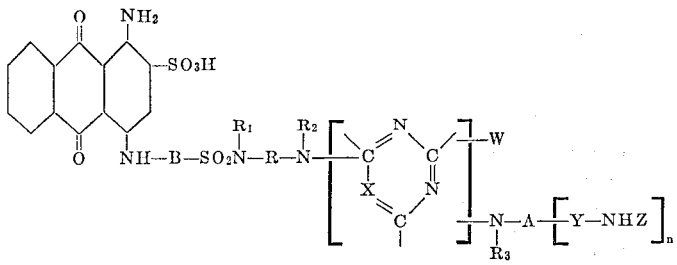

wherein
B represents phenylene,
$R_1$, $R_2$ and $R_3$ each independently represents H or an alkyl group having 1 to 4 carbon atoms,
R represents a radical selected from the group consisting of sulphophenylene, 1,2-ethylene and 1,3-propylene,
X represents N, C—Cl or C—CN,
W represents Cl or Br,
A represents a radical selected from the class consisting of a benzene radical of the formula $C_6H_{(5-n)}$, a carboxybenzene radical of the formula $$C_6H_{(4-n)}CO_2H$$

and a naphthalene radical of the formula $C_{10}H_{(7-n)}$,
Y represents CO or $SO_2$,
Z represents an alkylene of 2 or 3 carbon atoms and substituted in $\beta$-position to the NH group by Cl or $OSO_3H$, and
$n$ represents 1 or 2.

2. A dyestuff as claimed in claim 1 wherein the $SO_2$ group is attached to B in meta position to the NH group.

3. A dyestuff as claimed in claim 1, represented by the formula:

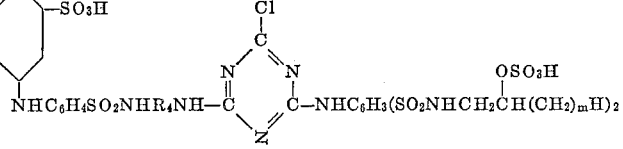

where
$R_4$ represents phenylene, sulphophenylene, ethylene or propylene, and
$m$ is 0 or 1.

References Cited

UNITED STATES PATENTS

| | | | |
|---|---|---|---|
| 3,070,602 | 12/1962 | Buehler | 260—249 |
| 3,225,043 | 12/1965 | Heslop | 260—249 |
| 3,254,084 | 5/1966 | Fleischhauer et al. | 260—249 |
| 3,271,397 | 9/1966 | Bitterli | 260—256.5 |

HENRY R. JILES, Primary Examiner

J. M. FORD, Assistant Examiner

U.S. Cl. X.R.

8—40; 260—239.7, 249, 256.5